(12) United States Patent
Tenny et al.

(10) Patent No.: US 10,764,812 B2
(45) Date of Patent: *Sep. 1, 2020

(54) SYSTEM AND METHOD FOR BEACON INTERVAL ADAPTATION

(71) Applicant: Futurewei Technologies, Inc., Plano, TX (US)

(72) Inventors: Nathan Edward Tenny, Portland, OR (US); Yalin Liu, Shanghai (CN); Jian Wang, Beijing (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/148,499

(22) Filed: Oct. 1, 2018

(65) Prior Publication Data

US 2019/0037471 A1 Jan. 31, 2019

Related U.S. Application Data

(63) Continuation of application No. 15/273,076, filed on Sep. 22, 2016, now Pat. No. 10,149,227.

(Continued)

(51) Int. Cl.
*H04W 4/00* (2018.01)
*H04W 40/24* (2009.01)
(Continued)

(52) U.S. Cl.
CPC .......... *H04W 40/244* (2013.01); *H04L 47/29* (2013.01); *H04W 4/027* (2013.01);
(Continued)

(58) Field of Classification Search
CPC ..... H04W 4/027; H04W 4/028; H04W 28/02; H04W 28/0268; H04W 40/24;
(Continued)

(56) References Cited

U.S. PATENT DOCUMENTS 7,222,175 B2 * 5/2007 Knauerhase .......... H04W 16/06
709/225
7,333,460 B2 2/2008 Vaeisaenen et al.
(Continued)

FOREIGN PATENT DOCUMENTS

CN 1592296 A 3/2005
CN 1842041 A 10/2006
(Continued)

OTHER PUBLICATIONS

Sati et al, Adapting the Beacon Interval for Opportunistic Network Communications, IEEE, 7 pages, 2015.*
(Continued)

*Primary Examiner* — Frank Duong
(74) *Attorney, Agent, or Firm* — Slater Matsil, LLP

(57) ABSTRACT

A method for operating a user equipment (UE) adapted to transmit beacons includes adjusting an initial beacon interval between successively transmitted beacons in accordance with a value of at least one parameter and a beacon configuration received from a network entity, thereby producing an adjusted beacon interval, and transmitting a beacon selected in accordance with the adjusted beacon interval in a beacon transmission opportunity determined in accordance with the initial beacon interval.

28 Claims, 7 Drawing Sheets

Related U.S. Application Data

(60) Provisional application No. 62/375,101, filed on Aug. 15, 2016.

(51) Int. Cl.
  *H04L 12/801* (2013.01)
  *H04W 4/02* (2018.01)
  *H04W 28/02* (2009.01)
  *H04W 52/02* (2009.01)
  *H04W 60/04* (2009.01)
  *H04W 88/02* (2009.01)
  *H04L 29/08* (2006.01)

(52) U.S. Cl.
  CPC ... *H04W 28/0268* (2013.01); *H04W 52/0261* (2013.01); *H04W 60/04* (2013.01); *H04L 69/323* (2013.01); *H04W 88/02* (2013.01); *Y02D 70/00* (2018.01); *Y02D 70/1262* (2018.01); *Y02D 70/142* (2018.01); *Y02D 70/144* (2018.01); *Y02D 70/164* (2018.01); *Y02D 70/166* (2018.01); *Y02D 70/25* (2018.01); *Y02D 70/26* (2018.01)

(58) Field of Classification Search
  CPC ... H04W 40/244; H04W 48/08; H04W 48/12; H04W 48/18; H04W 48/20; H04W 52/02; H04W 52/0261; H04W 88/02; H04L 12/28; H04L 12/801; H04L 47/29; H04L 69/323
  See application file for complete search history.

(56) References Cited

U.S. PATENT DOCUMENTS

| | | | |
|---|---|---|---|
| 7,583,651 B2 | 9/2009 | Yamada et al. | |
| 8,000,722 B2* | 8/2011 | Yan | H04W 60/00 455/456.1 |
| 8,472,463 B1* | 6/2013 | Ji | H04W 74/0808 370/439 |
| 9,204,368 B2* | 12/2015 | Chen | H04W 74/0816 |
| 2002/0013153 A1 | 1/2002 | Wilcock et al. | |
| 2006/0221927 A1 | 10/2006 | Yamada et al. | |
| 2006/0270438 A1 | 11/2006 | Choi | |
| 2008/0112348 A1 | 5/2008 | Park et al. | |
| 2014/0119277 A1 | 5/2014 | Athankutty et al. | |
| 2015/0117288 A1 | 4/2015 | Park | |

FOREIGN PATENT DOCUMENTS

| | | |
|---|---|---|
| CN | 1859798 A | 11/2006 |
| CN | 1937510 A | 3/2007 |
| CN | 101364920 A | 2/2009 |
| CN | 101442551 A | 5/2009 |
| CN | 104619009 A | 5/2015 |
| DE | 102005013648 A1 | 9/2006 |
| EP | 1463242 A2 | 9/2004 |
| JP | 2015088807 A | 5/2015 |

OTHER PUBLICATIONS

Joerer, "Improving Intersection Safety with Inter-Vehicle Communication," Computer and Communication Systems, Lehrstuhl fur Technische Informatik, May 2016, 196 pages.

Sati, et al., "Adapting the Beacon Interval for Opportunistic Network Communications," Advances in Computing, Communications and Informatics (ICACCI) International Conference, IEEE, Aug. 10-13, 2015, 7 pages.

Schmidt, et al., "Exploration of Adaptie Beaconing for Efficient Intervehicle Safety Communication," IEEE Network, Jan./Feb. 2010, 6 pages.

* cited by examiner

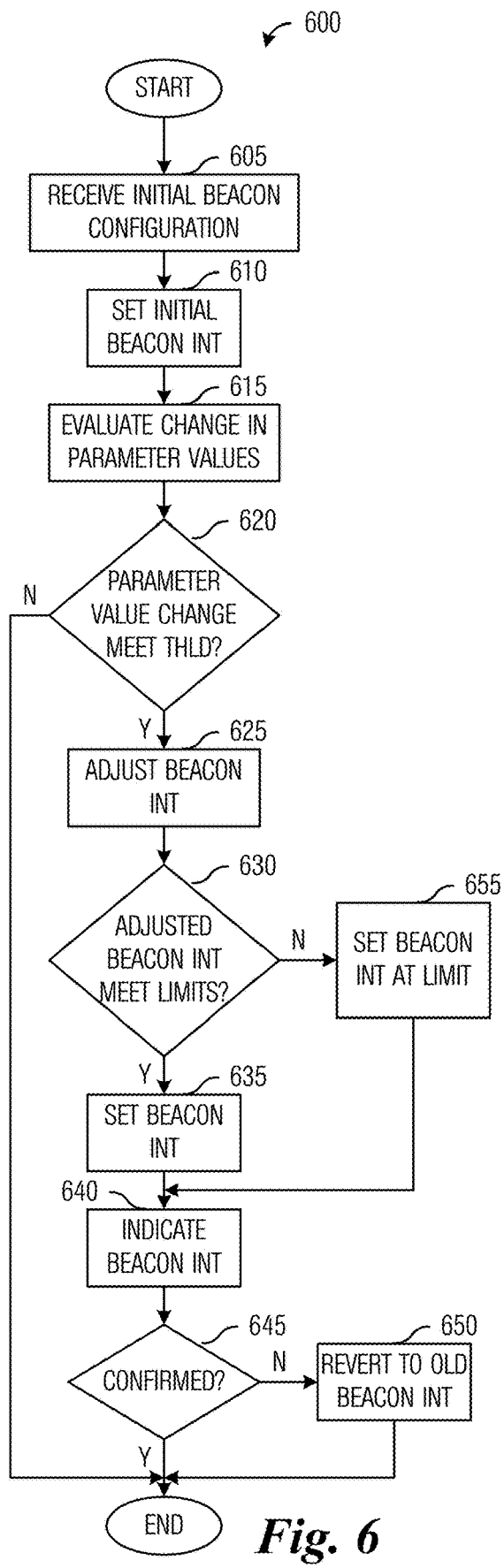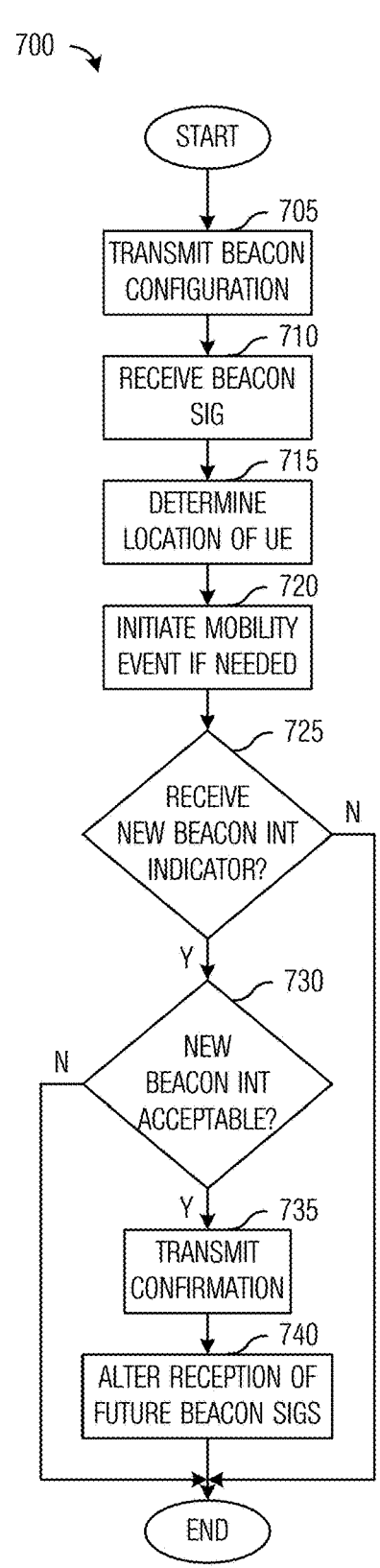
Fig. 6
Fig. 7

US 10,764,812 B2

SYSTEM AND METHOD FOR BEACON INTERVAL ADAPTATION

CROSS-REFERENCE TO RELATED APPLICATIONS

This application is a continuation of U.S. patent application Ser. No. 15/273,076, filed on Sep. 22, 2016, entitled "System and Method for Beacon Interval Adaptation," which claims the benefit of U.S. Provisional Application No. 62/375,101, filed on Aug. 15, 2016, entitled "System and Method for Beacon Interval Adaptation," all of which applications are hereby incorporated herein by reference in their entireties.

TECHNICAL FIELD

The present invention relates generally to a system and method for digital communications, and, in particular embodiments, to a system and method for beacon interval adaptation.

BACKGROUND

In the user equipment (UE) centric no cell (UCNC) radio concept, a UE is served by a set of transmit-receive points (TRPs) that are coordinated so that the TRPs appear to the UE as a one cell (or a virtual cell, a cloud cell, no cell, etc.). Although the set of TRPs has the appearance of one cell, the underlying network is made up of individual TRPs and the location of the UE has to be tracked in order to determine which TRP(s) should serve the UE. If the location of the UE is not tracked, additional latency and/or overhead is incurred when there is a need for a control or data transmission.

A UE transmits an uplink beacon signal at intervals to facilitate tracking of its location. The beacon is intended to be measureable, similar to a sounding reference signal (SRS) or random access channel (RACH) preamble. Different TRPs in the network measure the beacon and track the UE in the topology of the network by determining their respective radio conditions with respect to the UE. Additionally, the TRPs may also determine an approximate location of the UE, thereby tracking the UE geographically.

SUMMARY

Example embodiments provide a system and method for beacon interval adaptation.

In accordance with an example embodiment, a method for operating a user equipment (UE) adapted to transmit beacons is provided. The method includes adjusting, by the UE, an initial beacon interval between successively transmitted beacons in accordance with a value of at least one parameter and a beacon configuration received from a network entity, thereby producing an adjusted beacon interval, and transmitting, by the UE, a beacon selected in accordance with the adjusted beacon interval in a beacon transmission opportunity determined in accordance with the initial beacon interval.

In accordance with an example embodiment, a method for operating a network entity (NE) is provided. The method includes receiving, by the NE, a beacon interval indicator from a user equipment (UE), and altering, by the NE, beacon reception opportunities for subsequent beacons in accordance with a beacon interval determined in accordance with the beacon interval indicator.

In accordance with an example embodiment, a UE adapted to transmit beacons is provided. The UE includes a processor, and a computer readable storage medium storing programming for execution by the processor. The programming including instructions to configure the UE to adjust an initial beacon interval between successively transmitted beacons in accordance with a value of at least one parameter and a beacon configuration received from a network entity, thereby producing an adjusted beacon interval, and transmit a beacon selected in accordance with the adjusted beacon interval in a beacon transmission opportunity determined in accordance with the initial beacon interval.

In accordance with an example embodiment, a NE is provided. The NE includes a processor, and a computer readable storage medium storing programming for execution by the processor. The programming including instructions to configure the NE to receive a beacon interval indicator from a UE, and alter beacon reception opportunities for subsequent beacons in accordance with a beacon interval determined in accordance with the beacon interval indicator.

Practice of the foregoing embodiments enables the interval between beacons to be changed to meet changing conditions. Changing the interval between beacons efficiently uses available resources and reduces resource occupancy while accurately tracking the location of the UE.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 6 illustrates a flow diagram of example operations occurring in a UE adapting the beacon interval according to example embodiments described herein;

FIG. 7 illustrates a flow diagram of example operations occurring in a network entity participating in beacon interval adaptation according to example embodiments described herein;

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
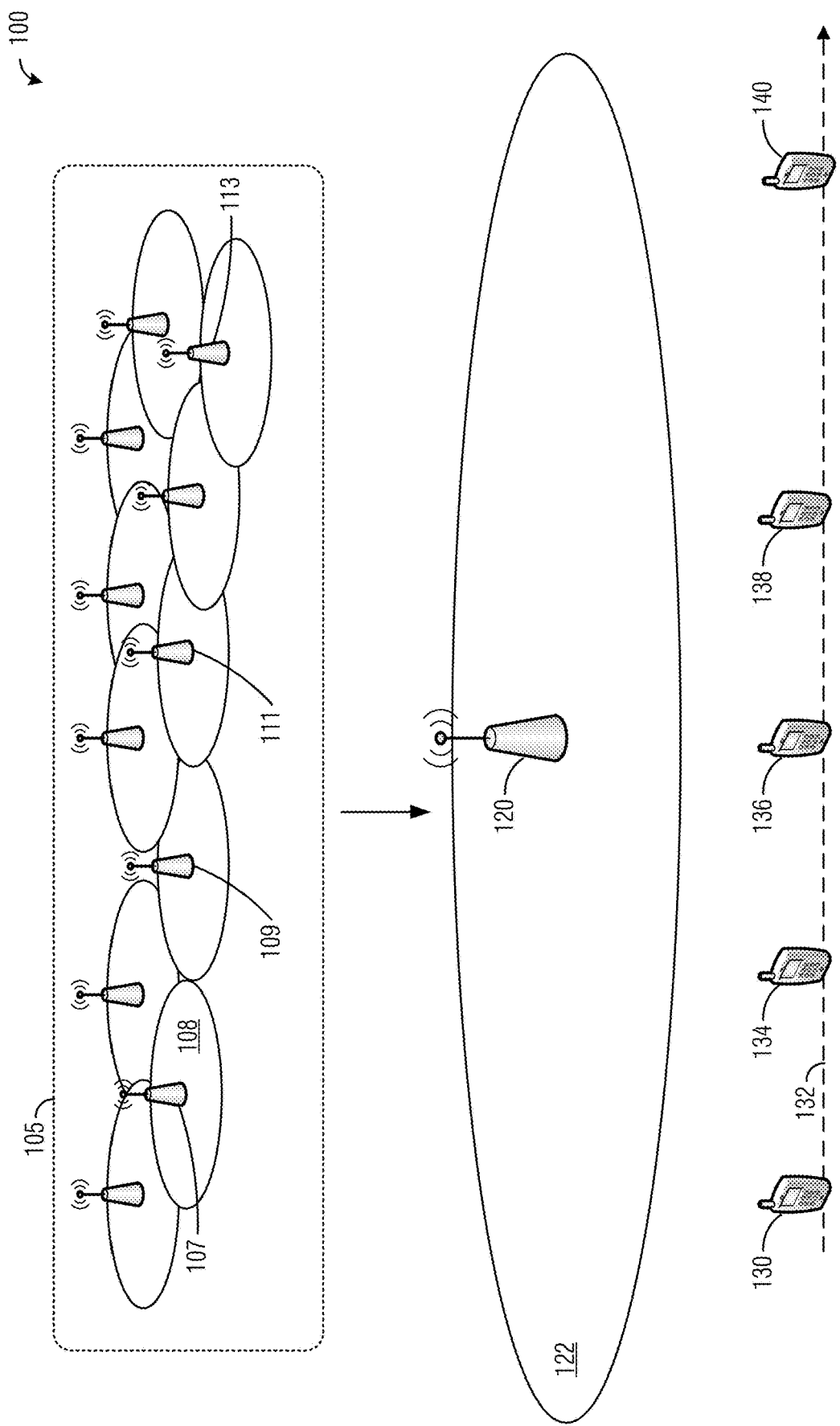
FIG. 1 illustrates an example communications system according to example embodiments described herein.

FIG. 1 illustrates an example communications system 100. Communications system 100 is a user equipment (UE) centric no cell (UCNC) radio deployment. Communications system 100 includes a plurality of transmit-receive points (TRPs) 105. Plurality of TRPs 105 includes TRPs 107, 109, 111, and 113, for example. Each of the TRPs has a coverage area, such as coverage area 108 of TRP 107. The TRPs may be base stations, NodeBs, evolved NodeBs (eNBs), gNodeBs (gNBs), master eNBs (MeNBs) or master gNBs (MgNBs), secondary eNBs (SeNBs) or secondary gNBs (SgNBs), access points, low power cells, femto cells, pico cells, small cells, remote radio heads, distributed antennas, and so on. The UE may be a mobile station, mobile, station, user, terminal, subscriber, and so on.

In a UCNC radio deployment, coordination is performed (by the TRPs or one or more centralized controllers, for example) to give plurality of TRPs 105 the appearance of being one cell from the UE's perspective. This appearance may not affect all protocol layers; for example, the physical (PHY) layer may distinguish the signals from individual TRPs, to assist with lower layer procedures such as channel state feedback, while higher layers may perceive the TRPs collectively as one cell. As shown in FIG. 1, plurality of TRPs 105 may present to UE 130 as one cell 120 with coverage area 122. In the UCNC radio deployment, moving between TRPs does not require handover, and preferably, no closed loop signaling. In some embodiments, there may be signaling between the network and the UE to support maintaining a configuration suitable for the UE to be served by the appropriate set of TRPs. However, such signaling is preferably decoupled from the actual mobility procedures.

UE 130 may be mobile. As shown in FIG. 1, UE 130 is moving horizontally along dashed line 132. UEs 134-140 illustrate the position of UE 130 at different times. As an example, UE 130 indicates the location of UE 130 at a first time, UE 134 indicates the location of UE 130 at a second time, UE 136 indicates the location of UE 130 at a third time, UE 138 indicates the location of UE 130 at a fourth time, and UE 140 indicates the location of UE 130 at a fifth time. Due to the coordination being performed on plurality of TRPs 105, UE 130 thinks that one cell 120 is continuing to serve UE 130 as UE 130 moves across line 132. In actuality, UE 130 is being served by different TRPs. As an illustrative example, at a first time UE 130 is being served by TRP 107. Then as UE 130 continues to move, UE 134 (actually UE 130 at the second time) is served by TRP 109, UE 136 (actually UE 130 at the third time) is served by TRP 111, UE 138 (actually UE 130 at the fourth time) is served by TRP 113, and UE 140 (actually UE 130 at the fifth time) is served by TRP 113. In some example embodiments, a UE may be served by a plurality of TRPs simultaneously, although this case is not illustrated in FIG. 1.

While it is understood that communications systems may employ multiple TRPs capable of communicating with a number of UEs, only plurality of TRPs 105 and one UE are illustrated for simplicity.

Alternatively, communications system 100 is a heterogeneous UCNC radio cell deployment, where plurality of TRPs 105 is implemented using small cells, while one cell 120 is part of a macro cell network. Macro cells are full power cells and typically make up a planned infrastructure, whereas small cells operate at lower power and may be planned or unplanned in various deployments. Examples of macro cells include Third Generation Partnership (3GPP) Long Term Evolution (LTE) compliant evolved NodeBs (eNBs), Global System for Mobile Communications (GSM) base stations, and the like. An example deployment may be as follows: plurality of TRPs 105 provides data connectivity for UE 130, while the macro cells (including one cell 120) provide control and/or data connectivity for UE 130. In other words, data traffic takes place using plurality of TRPs 105, while the macro cells provide control plane connectivity with some data plane connectivity, if needed. In the heterogeneous UCNC radio cell deployment, one cell 120 (or some other macro cell or a network entity that is part of the macro cell network) performs coordination tasks, such as TRP selection as UE 130 moves, for example.

In either deployment scenario discussed above, an entity that is performing the coordination also tracks the position of the UEs and determines which TRPs are closest to the UEs (or alternatively, which TRPs have the best quality channel with the UEs). These TRPs may be referred to as serving TRPs. The position of the UEs may be considered in terms of geographic location, radio conditions within the network topology, etc. In a UCNC radio deployment, the UE periodically sends a beacon like signal (hereinafter referred to as beacon signal) that allows the entity to track the position of the UE and determine the serving TRPs. The set of serving TRPs may be reconfigured as necessary (e.g., due to UE mobility, TRP load, network condition, etc.), transparent to the UEs. Configuration of the TRPs serving the UE may be necessary, for example, to coordinate the use of radio resources between different TRPs. The entity maintains local UE identities for the UEs sufficiently unique to unambiguously identify the UEs when necessary. The beacon signal conveys the identity of the UE transmitting the beacon signal, e.g., through the radio resource used to send the beacon signal.

Figure 2:
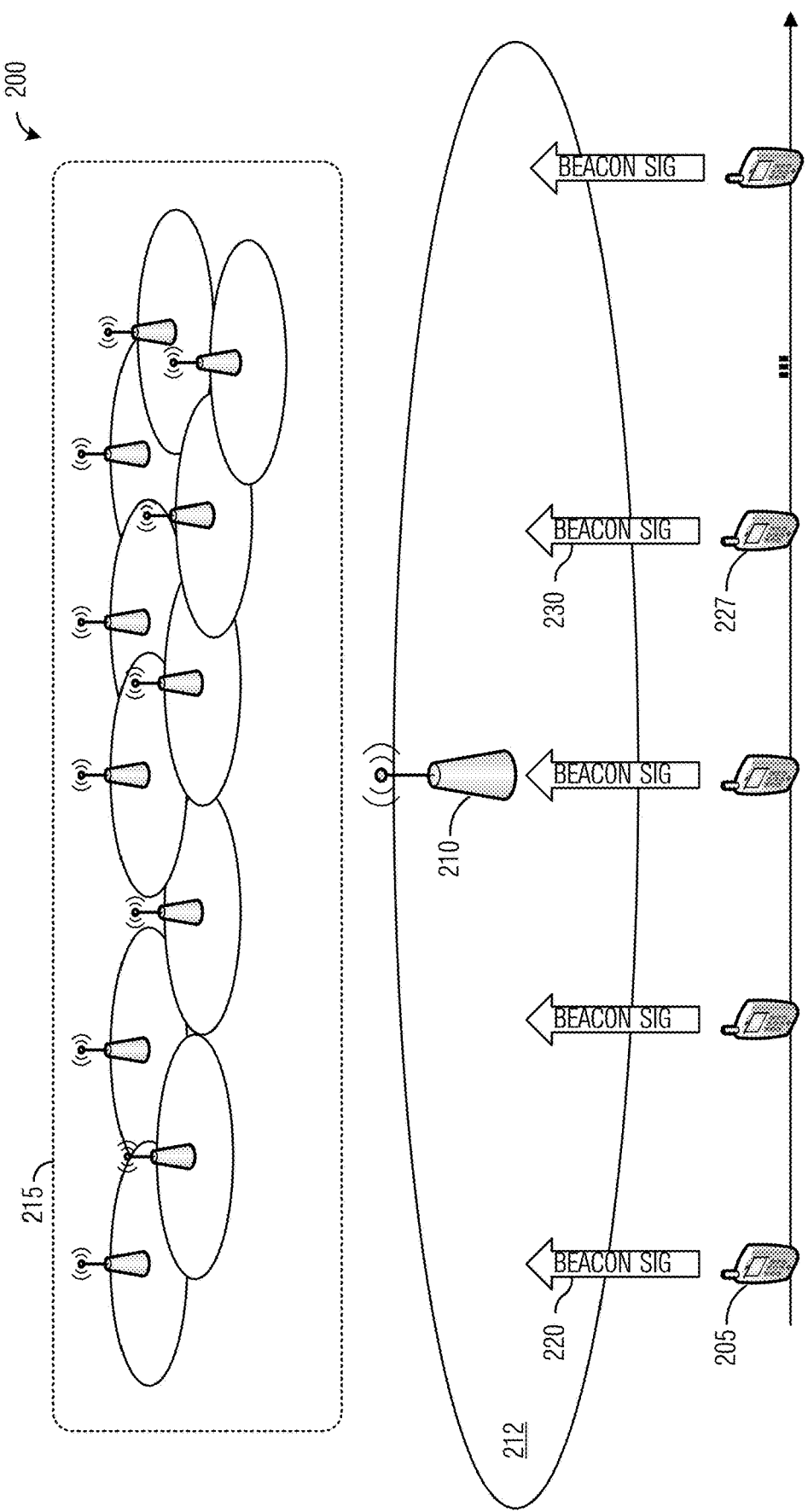
FIG. 2 illustrates an example communications system highlighting UE transmitted beacons for tracking purposes according to example embodiments described herein.

FIG. 2 illustrates an example communications system 200 highlighting UE transmitted beacon signals for tracking purposes. Communications system 200 includes a UE 205 being served by one cell 210 with corresponding coverage area 212. Although viewed by UE 205 as a single cell, one cell 210 may be implemented through coordination performed by an entity in communications system 200 using a plurality of TRPs 215. The entity may be a standalone entity in communications system 200 or an entity in macro cell layer of communications system 200. Alternatively, one cell 210 is a macro cell that is part of a macro cell network, such as described previously.

UE 205 periodically transmits beacon signals, such as beacon signal 220. At a later time, UE 205 (now shown and referred to as UE 227 to prevent confusion) transmits beacon signal 230. One cell 210 receives the beacon signals and approximates the location of UE 205. As long as UE 205 continues to transmit beacon signals, the location of UE 205 may be approximated by any of a number of methods (e.g., geometric trilateration based on the signal timing and/or pathloss, a lookup table with location approximations based on RF conditions, and so on) and one or more TRPs may be selected to serve UE 205.

A potential network side limitation on the use of UE transmitted beacon signals for tracking purposes is network uplink capacity. Uplink resource allocation needs to reserve a portion of available network resources for the beacon signals. The exact amount of available network resources depends on the beacon signal (i.e., the beacon signal content and size) and an assumed link budget, which should be conservative to reduce the impact of beaconing on overall communications system performance, ensuring the detection of the beacon signals even in adverse radio conditions. Depending upon deployment, a beacon signal may include as little as a single resource element, or as much as a plurality of resource blocks. Modulation is generally assumed to be low order, no more than quadrature phase shift keying (QPSK), for example, to reduce the risk of decoding failure in poor radio conditions.

In a communications system with a large number of UEs, such as in a massive Internet of Things (mIoT) deployment, resource allocations for beacon signals may consume a significant amount of available uplink resources. Code multiplexing helps to manage uplink resource usage by allocating multiple UEs to use the same resource blocks for beacon signal transmissions, but the code sequences are generally short, thereby limiting the benefits. If the beacon signals have to convey information beyond a simple presence indication, additional data modulation is needed or multiple sequences have to be assigned to each UE. Furthermore, the uplink beacon signal transmissions appear as interference at other receivers, especially at neighboring cells when the UEs are located at the cell edge (a location where the beacon signals are most needed to trigger handovers for active UEs).

A potential UE side limitation on the use of UE transmitted beacon signals for tracking purposes is power efficiency. Along with other UE operations, transmitting beacon signals increases power consumption at the UE, therefore, the transmission of beacon signals by UEs should be as infrequent as possible to conserve power and increase battery life. Power consumption at the UE may be a point for potential optimization.

Intrinsically, active UEs (UEs that are known to the network at the cell level) need to send beacon signals more frequently than idle or low activity UEs (UEs that are known to the network at the regional level, e.g., tracking area (TA) or similar). However, even for active UEs, frequent transmission of beacon signals when the UE is stationary or relatively stationary is a waste of power and resources. On the other hand, more frequent transmission of beacon signals by idle or low activity UEs can allow smaller tracking regions, e.g., smaller TAs, which reduces the paging load on the network as a whole, but at the cost of increased usage of uplink resources for the beacon signals.

Therefore, there is a need to ensure that:
  Beacon signals are sparse (transmitted infrequently) enough to have an acceptable uplink resource impact;
  Beacon signals are dense (transmitted frequently) enough to enable accurate handovers for active UEs;
  Beacon signals are sparse enough to limit battery drain to an acceptable level; and
  Beacon signals are dense enough to control paging load for idle UEs.

Figure 3:
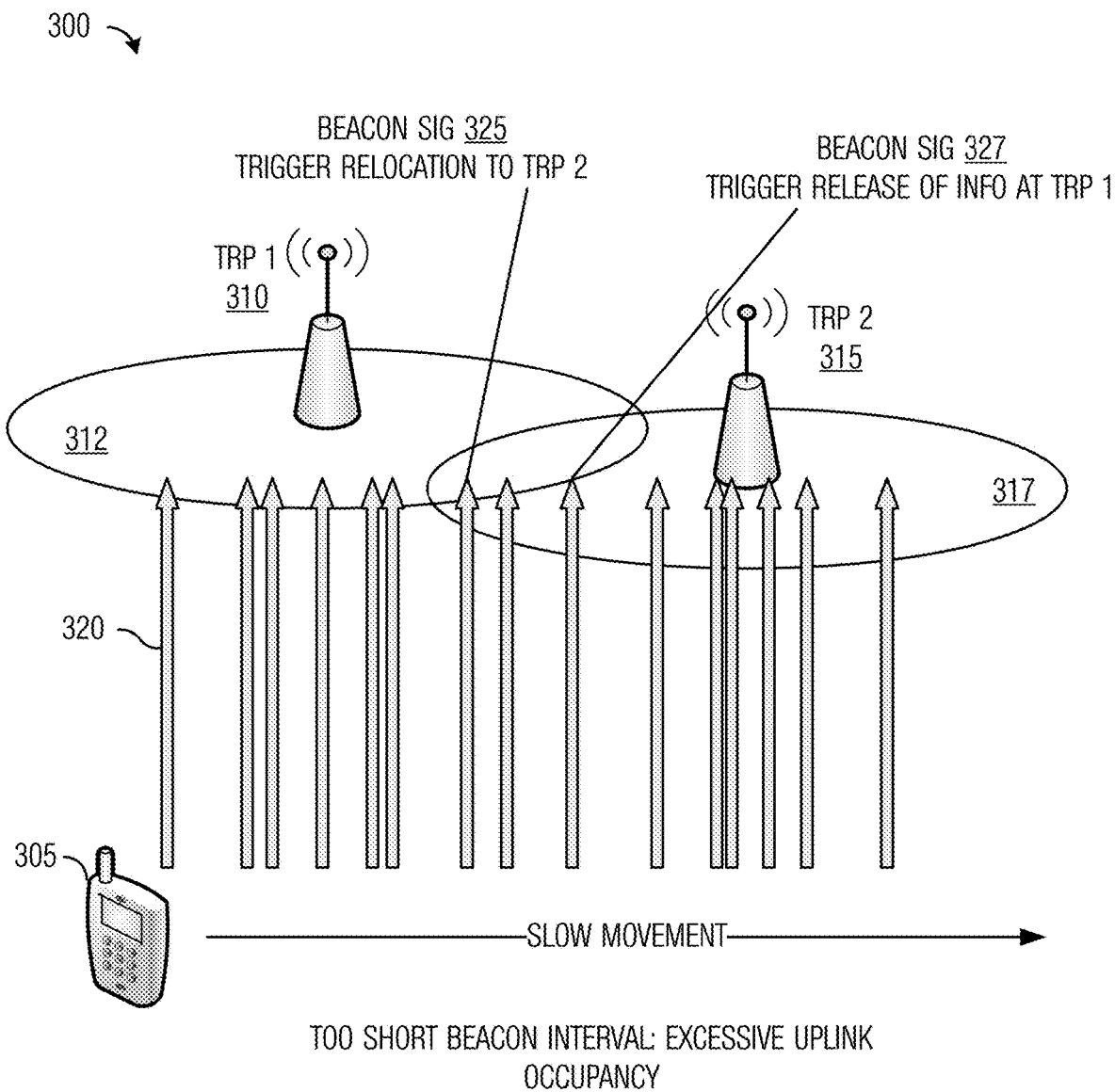
FIG. 3 illustrates a communications system highlighting beaconing by a UE with low mobility according to example embodiments described herein.

FIG. 3 illustrates a communications system 300 highlighting beaconing by a UE with low mobility. Communications system 300 includes a UE 305, a first TRP 310 with coverage area 312, and a second TRP 315 with coverage area 317. As shown in FIG. 3, UE 305 is moving from left to right across coverage areas 312 and 317. UE 305 is transmitting beacon signals, such as beacon signal 320 at a fixed time interval (or a fixed rate). Beacon signal 325 triggers the relocation of UE 305 to second TRP 315 and beacon signal 327 triggers the release of information of UE 305 at second TRP 310.

The fixed time interval in which UE 305 is transmitting beacon signals is too short (or the fixed rate is too high) for the mobility of UE 305, resulting in an excessive number of beacon signals transmitted by UE 305 as UE 305 moves across coverage areas 312 and 317. As shown in FIG. 3, many more beacon signals are transmitted by UE 305 than needed (beacon signals 325 and 327 are the only beacon signals that are needed to ensure a successful handover. The excessive number of beacon signals results in wasting available network resources and UE 305 expending too much power.

Figure 4:
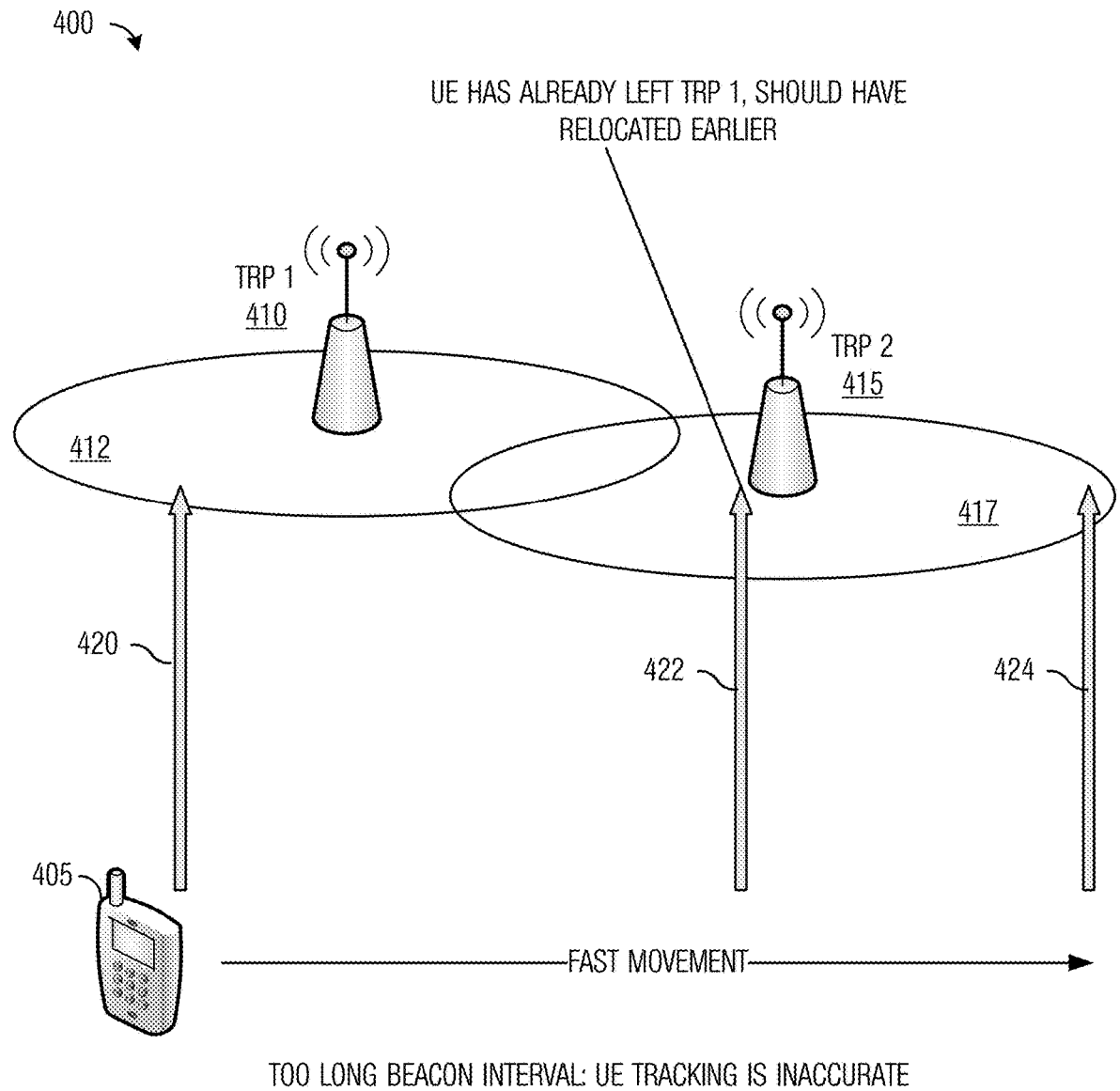
FIG. 4 illustrates a communications system highlighting beaconing by a UE with high mobility according to example embodiments described herein.

FIG. 4 illustrates a communications system 400 highlighting beaconing by a UE with high mobility. Communications system 400 includes a UE 405, a first TRP 410 with coverage area 412, and a second TRP 415 with coverage area 417. As shown in FIG. 4, UE 405 is moving from left to right across coverage areas 412 and 417. UE 405 is transmitting beacon signals, such as beacon signal 420 at a fixed time interval (or a fixed rate).

The fixed time interval in which UE 405 is transmitting beacon signals is too long (or the fixed rate is too low) for the mobility of UE 405, resulting in too few beacon signals transmitted by UE 405 as UE 405 moves across coverage areas 412 and 417. A shown in FIG. 4, only beacon signals 420, 422, and 424 are transmitted by UE 405 before UE 405 exits coverage area 417. UE 405 has already left coverage area 412 before beacon signal 422 is transmitted. Because beacon signal 422 is transmitted after UE 405 has left coverage area 412, first TRP 410 does not have a good location approximation of UE 405 and does not anticipate that a handover is needed. By the time beacon signal 422 is transmitted, UE 405 is already in coverage area 417 and second TRP 415 is not expecting UE 405. Similarly, by the time beacon signal 424 is transmitted, UE 405 is almost ready to exit coverage area 417.

Although the discussion focuses on a time interval in which beacon signals are transmitted (i.e., a beacon interval), the example embodiments presented herein are operable with other parameters for characterizing the transmission of beacon signals, including beacon rate, beacon frequency, beacon duration, beacon spacing, and so on. Therefore, the discussion of beacon interval should not be construed as being limiting to either the scope or the spirit of the example embodiments.

According to an example embodiment, a system and method for adapting, or equivalently adjusting, the beacon interval is provided. The beacon interval is adapted by the UE or by a combination of the UE and a network entity, such as a TRP or a radio centralized unit (RCU). The UE may adapt the beacon interval and notifies the network if the beacon interval is changed. The network entity may adjust the beacon interval and notify the UE of changes.

According to an example embodiment, a system and method for adapting or adjusting the beacon interval with UE involvement is provided. The UE may adapt the beacon interval based on parameters that have an impact on beacon coverage, such as UE velocity (historical and/or current), battery condition, power usage condition, signal quality, observed mobility events, and so on. The UE may also consider information signaled by the network in the adaptation of the beacon interval. The information signaled by the network may trigger the UE to adapt the beacon interval, or place limits on the beacon interval or the amount of change to the beacon interval.

Figure 5:
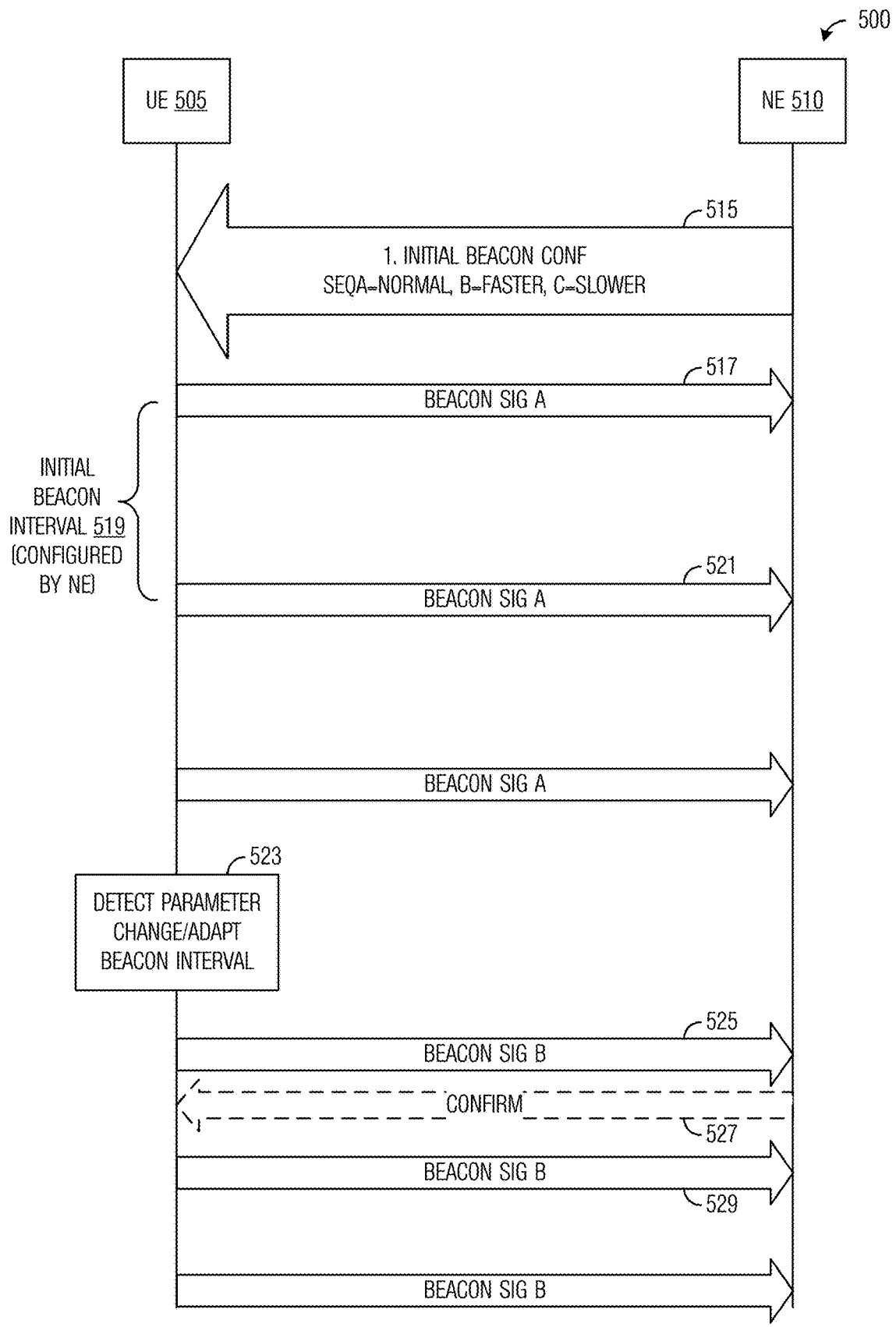
FIG. 5 illustrates a diagram of messages exchanged and processing performed by devices participating in beacon interval adaptation according to example embodiments described herein.

FIG. 5 illustrates a diagram 500 of messages exchanged and processing performed by devices participating in beacon interval adaptation. Diagram 500 displays messages exchanged and processing performed by a UE 505 and a network entity (NE) 510 as the devices participate in beacon interval adaptation.

Network entity 510 transmits an initial beacon configuration to UE 505 (event 515). The initial beacon configuration may include a range of allowable beacon intervals, such as a minimum beacon interval and a maximum beacon interval, or a plurality of allowable beacon intervals (e.g., normal beacon interval, faster beacon interval, and slower beacon interval). There may be different allowable beacon intervals for idle and active UEs (or similar terms meaning UEs located to the cell level (active) and located to the TA level (idle)). UE 505 selects a beacon interval, e.g., the normal beacon interval or a mid-beacon interval, and begins transmitting beacon signals (events 517 and 521) as UE 505 moves through the coverage areas of multiple TRPs. The beacon signals are used to locate UE 505 in the network, assign transmit and/or receive resources, and so on.

The beacon signal may be a sequence of some kind offering good orthogonality between sequences that can be assigned to different UEs. As an illustrative example, a sequence based on the 3GPP LTE preamble is used. The sequence is expressible as $$x_u(n) = e^{-j\frac{\pi u n(n+1)}{N_{ZC}}}, \quad 0 \le n \le N_{ZC} - 1,$$

where $N_{ZC}$ is the length of a Zadoff-Chu sequence used, and u is the u-th root Zadoff-Chu sequence.

However, the number of available Zadoff-Chu sequences may not be sufficient when large numbers of UEs are in the network and each UE has to be allocated one or more sequences. Another possible sequence may be one based on other types of Reed-Muller sequences. A pool of sequences in which different sequences are orthogonal or at least strongly quasi-orthogonal is used. It is noted that absolute reliability is not critical. However, the network must be able to accurately distinguish the beacon signals of different UEs, and losses should be rare because they can confuse the network and temporarily cause lost UE situations to develop.

As shown in FIG. 5, the beacon signal corresponding to event 517 and the beacon signal corresponding to event 521 are separated in time by an interval equal (or substantially equal) to the beacon interval (initial beacon interval 519) selected by UE 505. UE 505 detects a change in at least one parameter and adapts the beacon interval (block 523). As discussed previously, the parameters considered by UE 505 may include UE velocity (historical and/or current), battery condition, power usage condition, signal quality, observed mobility events, and so on. If one or more of the values of the parameters change, UE 505 adapts the beacon interval in accordance with the parameter values. According to an example embodiment, the value of the one or more parameters have to change by more than a specified amount (which may differ for different parameters) before UE 505 adapts the beacon interval. The specified amounts for each parameter may be specified by a technical standard or an operator of the communications system. Alternatively, the specified amounts may be determined by devices in the communications system based on conditions in the communications system. It is noted that in some of these exemplary cases, e.g., the use of observed mobility events as a criterion, the UE beacon interval adaptation triggered on value changes in the one or more parameters depends upon the ability of the UE to detect mobility. In some situations, there may not be a detectable distinction between TRPs and the UE may not be able to apply the related mobility information. However, even if no TRP distinction is visible to some protocol layers, e.g., the radio resource control (RRC) layer, there may be lower level parameters, such as the PHY layer parameters, that distinguish one TRP from another. In such a situation, the UE may use the PHY layer to notify higher layers of TRP changes, even if changes are not directly detectable in Layers 2 or 3.

As an illustrative example, the parameter triggering beacon interval adaptation is UE velocity. The UE velocity used by the UE to adapt the beacon interval may be a current value, a historical value, or a combination of current and historical values. The UE velocity is commonly known to an application processor or to sensors located in the UE. A global navigation satellite system (GNSS) based UE velocity is possibly the most reliable, but dead reckoning techniques based on accelerometers are also usable. If the UE velocity is high (e.g., exceeds a high velocity threshold), the UE may decrease the beacon interval to increase the number of beacons. The high velocity threshold may be defined relative to TRP coverage, which would imply network input, e.g., a threshold for considering a particular velocity as being high. Considering coverage area, the network may determine a maximum velocity (as a function of the beacon interval) that would result in the expectation of at least N beacon transmissions before the UE traverses the coverage area, where N is a positive integer value. Conversely, if the UE velocity is low (e.g., falls below a low velocity threshold), the UE may increase the beacon interval to decrease the number of beacon transmissions in a fixed time interval. The considerations provided for specifying the high velocity threshold also apply for specifying the low velocity threshold.

As an illustrative example, the parameter triggering beacon interval adaptation is battery and/or power condition. If the battery condition of the UE is below a battery threshold, the UE may increase the beacon interval to conserve power and extend battery life. If the UE is externally powered (e.g., the UE is plugged into a wall outlet or a battery bank), the UE may decrease the beacon interval to improve beaconing performance because battery life is not a consideration.

As an illustrative example, the parameter triggering beacon interval adaptation is downlink signal quality. The downlink signal quality may be indicated in a reference signal received power (RSRP) or reference signal received quality (RSRQ) report generated by the UE or determined from measurements of reference signals, such as primary synchronization signal (PSS) or secondary synchronization signal (SSS). If the downlink signal quality is below a quality threshold, the UE may increase the beacon interval to reduce the number of beacons, which may result in an increased downlink signal quality. The quality threshold may be provided to the UE in the initial beacon configuration.

As an illustrative example, the parameter triggering beacon interval adaptation is observed mobility events. If the UE observes that it is experiencing handovers between the same TRPs (commonly referred to as ping-ponging) the UE may decrease the beacon interval. If the UE observes that it is experiencing large numbers of beacon transmissions between mobility, the UE may increase the beacon interval to reduce interference, resource load, and/or battery drain.

UE 505 transmits a beacon signal in accordance with the beacon interval prior to adaptation (event 525). In other words, the beacon signal transmitted in event 525 occurs in a beacon transmission opportunity that is determined based on the beacon interval prior to adaptation. In a situation wherein UE 505 has changed the beacon interval, the beacon signal transmitted by UE 505 may be different from a previously transmitted beacon to indicate that the beacon interval has been changed.

According to an example embodiment, multiple sequences are assigned to a UE, allowing a UE to use different sequences to indicate changes in beacon interval. As an illustrative example, as shown in FIG. 5, UE 505 initially transmits a first beacon signal, such as beacon signal A at times 517 and 521 (corresponding to a first sequence being transmitted) to represent the initial beacon interval. After adapting the beacon interval, UE 505 transmits a second beacon signal, such as beacon signal B at times 525 and 529 (corresponding to a second sequence being transmitted) to represented the changed beacon interval. In a situation when related sequences are used, a small amount of information may be indicated when a different generating function is used. As an example, each UE is assigned three sequences to use as beacon signals, with a first sequence to represent no change in beacon interval, a second sequence to represent a decrease in beacon interval, and a third sequence to represent an increase in beacon interval. When the UE adapts the beacon interval, the UE indicates to the network using a corresponding sequence as the beacon signal. The choice of generating function corresponding to the sequence used by the UE may encode a small amount of information, e.g., one generating function may indicate an intention to adjust the beacon interval upward.

Although the assignment of multiple sequences for beacon signals transmitted by each UE increases the decoding burden at the network entity, the net effect is reducing overall beacon signal density. Furthermore, the network entity will not have to try to decode a beacon signal that is known to be absent. Therefore, the decoding effort at the network entity may actually decrease when considered in the aggregate. The use of multiple sequences per UE requires that the sequence space is sufficiently large to enable the assignment of multiple sequences to each UE without sequence collisions. Orthogonality in time and frequency can be used to increase the sequence space. A unique combination of beacon discontinuous transmission (DTX) cycle offset+beacon resource element+beacon sequence ensures that sequences do not collide.

According to another example embodiment, a more complex beacon signal is used, wherein the beacon signal includes a payload. When the beacon interval is changed, the UE includes an indicator of the beacon interval in the beacon signal. As an example, the beacon signal includes an indicator of the beacon interval. As another example, the beacon signal includes an indicator of the direction (i.e., increase or decrease) of the change in the beacon interval. As yet another example, the beacon signal includes an indicator of an amount of change in the beacon interval, along with a sign (i.e., increase or decrease). As yet another example, the beacon signal includes an indicator of a beacon interval index corresponding to a beacon interval selected by the UE.

UE 505 may receive a confirmation from network entity 510 (event 527). In an example embodiment, UE 505 is required to wait for the confirmation from network entity 510 prior to making the change to the beacon interval. The confirmation may be similar to the beacon signal, i.e., a simple sequence representing confirmation. In another example embodiment, UE 505 is not required to receive confirmation. However, network entity 510 may transmit a rejection to indicate that UE 505 is not to change the beacon interval. A simple sequence may also be used to represent the rejection. In yet another example embodiment, a more complex beacon signal or multiple sequences are used to enable network entity 510 to confirm or reject the changed beacon interval. UE 505 receives confirmation of the changed beacon interval, or does not receive rejection of the changed beacon interval and continues to transmit beacon signals at the changed beacon interval. UE 505 may continue to transmit beacon signals at the changed beacon interval until UE 505 detects another parameter change and adapts the beacon interval again (block 523). In an example embodiment, the number of beacon interval values is limited, so it is possible for UE 505, after making several changes to the beacon interval, to become unable to make further changes to the beacon interval (at least in the same direction). In such a situation, UE 505 can no longer change the beacon interval in the same direction (either continuing to decrease or increase the beacon interval), however, UE 505 can change the beacon interval in the different direction if the parameter values warrant the change.

As discussed previously, the initial beacon configuration may include multiple beacon interval values, a range of beacon intervals, or multiple ranges of beacon intervals. Each of the multiple ranges of beacon intervals may be applied to different types of UEs, or to UEs in different states or operating modes, such as idle UEs or active UEs (if beacon signals are used in both cases), for example. An example format in ASN.1 notation for ranges of beacon intervals is as follows:

Beacon intervals in milliseconds. If the optional min and max values are given, the UE may adjust its beacon interval semi-autonomously.

UL-BeaconIntervalRange::=SEQUENCE {
beaconInterval ENUMERATED(10,20,40,80,160,320, 640,1280),
minInterval ENUMERATED(10,20,40,80,160,320) OPTIONAL,
maxInterval ENUMERATED(40,80,160,320,640,1280) OPTIONAL}.

Additional parameters included in the initial beacon configuration may include indications of different conditions under which the UE is allowed to adjust the beacon interval. Examples of the additional parameters may include:

A boolean value to indicate if the UE has to receive a confirmation from the network;

A boolean value to indicate if the UE may receive a rejection from the network;

A repetition factor before making the change to the beacon interval to increase probability of reception; and An indication of whether physical movement is an allowed parameter.

According to an example embodiment, semi-blind decoding is performed in the network entity to receive the multiple sequences representing different beacon signals. The network entity knows the specific sequences assigned to each UE. The network entity also knows that the sequences in the set of sequences assigned to a single UE are related by their generating functions. Therefore, if the network entity knows which UEs can transmit on particular network resources, the network entity can target the decoding hypotheses used in blind decoding to the applicable set(s) of generating functions.

According to an example embodiment, the network entity is able to trigger a change in the beacon interval of a UE. The network entity does not have to have an active connection with the UE. A lower layer signaling mechanism, such as one used to confirm beacon interval change at the UE, for example, a media access control control element (MAC CE), may be used by the network entity to instruct the change in the beacon interval. PHY layer signaling may also be used.

A very limited amount of information needs to be conveyed in the signal. A few bits, e.g., 1 bit to indicate adjust beacon interval up or adjust beacon interval down, is sufficient. Alternatively, an explicit beacon interval may be included. As an illustrative example, using an example range of beacon intervals with 8 distinct beacon interval values, only 3 bits are required. In all situations, the newly triggered beacon interval starts at the next beacon transmission opportunity based on the current beacon interval (prior to the beacon interval adjustment) of the UE. Typically, the network entity can quickly detect (within 2 beacon signals, for example) if the UE has received the beacon interval change instruction and adjusted the beacon interval accordingly. The instruction may be repeated if needed. In a situation wherein the UE misses the instruction, the situation may be corrected by the network entity without requiring additional signaling (in addition to the retransmission of the instruction).

FIG. 6 illustrates a flow diagram of example operations 600 occurring in a UE adjusting the beacon interval. Operations 600 may be indicative of operations occurring in a UE as the UE adjusts the beacon interval.

Operations 600 begin with the UE receiving an initial beacon configuration from a network entity (block 605). The initial beacon configuration may include a range of allowable beacon intervals, such as a minimum beacon interval and a maximum beacon interval, or a plurality of allowable beacon intervals. The UE sets an initial beacon interval (block 610). The initial beacon interval may be specified by the network entity. Alternatively, the UE selects the initial beacon interval from possible beacon intervals provided in the initial beacon configuration. The UE detects a change in one or more parameter values (block 615). The UE performs a check to determine if the parameter value change meets a threshold (block 620). The threshold, which may be specified in a technical standard, an operator of the communications system, or determined by devices in the communications system, may help to prevent rapid changes in the beacon interval, which may lead to ping-ponging of the beacon interval or negatively impact overall performance of the communications system.

If the parameter value change meets the threshold, the UE adjusts the beacon interval (block 625). The adjusted beacon interval may be determined in accordance with the parameter values. The adjusted beacon interval may be one of the beacon intervals specified in the initial beacon configuration or the UE may determine a beacon interval that is within an allowable range as specified in the initial beacon configuration. The UE performs a check to determine if the adjusted beacon interval is within limits specified by the initial beacon configuration (block 630). If the adjusted beacon interval is within the limits, the UE sets the beacon interval to be equal to the adjusted beacon interval (block 635) and transmits an indication of the beacon interval (block 640). As discussed previously, the UE may indicate the beacon interval by transmitting a different beacon signal or include an indication of the beacon interval in the beacon signal. The UE performs a check to determine if a confirmation of the beacon interval is received (block 645). If the confirmation is received, operations 600 terminate. If the confirmation is not received, the UE reverts back to the old beacon interval (block 650). The UE may wait a specified amount of time before determining that the confirmation is not received. The specified amount of time may be specified in a technical standard, an operator of the communications system, or determined by devices in the communications system based on operating conditions and/or historical information.

If the adjusted beacon interval is not within limits (block 630), the UE sets the beacon interval to be equal to the limit and moves to block 640 to indicate the beacon interval.

FIG. 7 illustrates a flow diagram of example operations 700 occurring in a network entity participating in beacon interval adjusting. Operations 700 may be indicative of operations occurring in a network entity as the network entity participates in beacon interval adjusting.

Operations 700 begin with the network entity transmitting an initial beacon configuration (block 705). The network entity receives a beacon signal from the UE (block 710) and estimates the location of the UE based on the beacon signal (block 715). Depending on the location of the UE, the network entity may initiate a mobility event, to initiate a handover, for example (block 720). The network entity performs a check to if an indicator of a new beacon interval has been received (block 725). An indicator of a new beacon interval may be in the form of a beacon signal comprising a sequence that is different from a sequence used in previously received beacon signals or the indicator may be included in the received beacon signal. The network entity performs a check to determine if the new beacon interval is acceptable (block 730). If the new beacon interval is acceptable, the network entity transmits a confirmation (block 735) and changes the reception of future beacon signals (block 740). In other words, the network entity changes when to expect future beacon signals from the UE. If the new beacon interval is not acceptable, operations 700 terminates, which may be an implicit indicator to the UE that the new beacon interval is not acceptable. In different embodiments, the network entity may transmit a rejection of the new beacon interval or the network entity may transmit a confirmation if the new beacon interval is acceptable and a rejection if the new beacon interval is not acceptable.

Figure 8:
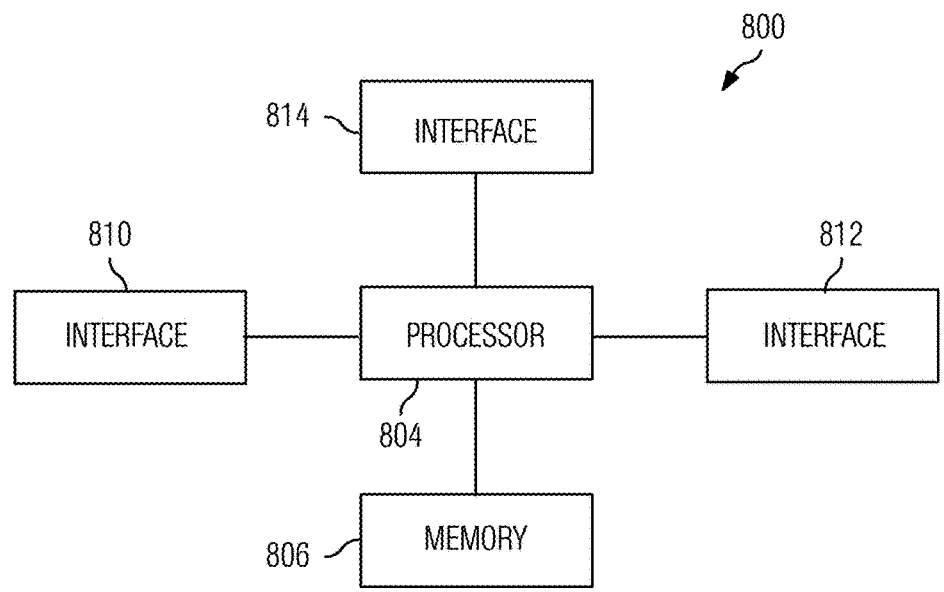
FIG. 8 illustrates a block diagram of an embodiment processing system for performing methods described herein.

FIG. 8 illustrates a block diagram of an embodiment processing system 800 for performing methods described herein, which may be installed in a host device. As shown, the processing system 800 includes a processor 804, a memory 806, and interfaces 810-814, which may (or may not) be arranged as shown in FIG. 8. The processor 804 may be any component or collection of components adapted to perform computations and/or other processing related tasks, and the memory 806 may be any component or collection of components adapted to store programming and/or instructions for execution by the processor 804. In an embodiment, the memory 806 includes a non-transitory computer readable medium. The interfaces 810, 812, 814 may be any component or collection of components that allow the processing system 800 to communicate with other devices/components and/or a user. For example, one or more of the interfaces 810, 812, 814 may be adapted to communicate data, control, or management messages from the processor 804 to applications installed on the host device and/or a remote device. As another example, one or more of the interfaces 810, 812, 814 may be adapted to allow a user or user device (e.g., personal computer (PC), etc.) to interact/communicate with the processing system 800. The processing system 800 may include additional components not depicted in FIG. 8, such as long term storage (e.g., non-volatile memory, etc.).

In some embodiments, the processing system 800 is included in a network device that is accessing, or part otherwise of, a telecommunications network. In one example, the processing system 800 is in a network-side device in a wireless or wireline telecommunications network, such as a base station, a relay station, a scheduler, a controller, a gateway, a router, an applications server, or any other device in the telecommunications network. In other embodiments, the processing system 800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 9:
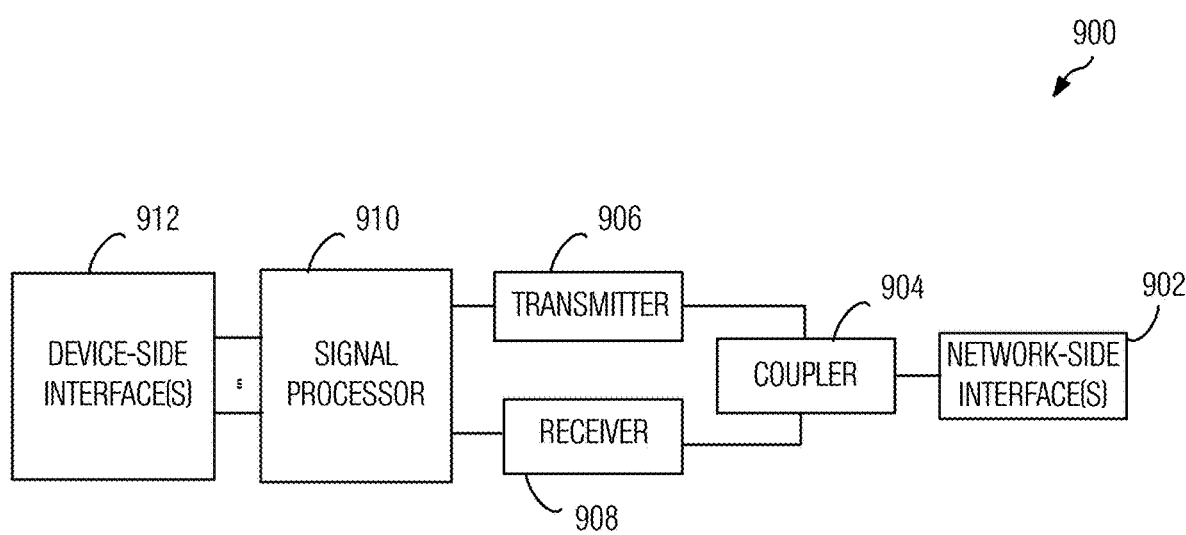
FIG. 9 illustrates a block diagram of a transceiver adapted to transmit and receive signaling over a telecommunications network according to example embodiments described herein.

In some embodiments, one or more of the interfaces 810, 812, 814 connects the processing system 800 to a transceiver adapted to transmit and receive signaling over the telecommunications network. FIG. 9 illustrates a block diagram of a transceiver 900 adapted to transmit and receive signaling over a telecommunications network. The transceiver 900 may be installed in a host device. As shown, the transceiver 900 comprises a network-side interface 902, a coupler 904, a transmitter 906, a receiver 908, a signal processor 910, and a device-side interface 912. The network-side interface 902 may include any component or collection of components adapted to transmit or receive signaling over a wireless or wireline telecommunications network. The coupler 904 may include any component or collection of components adapted to facilitate bi-directional communication over the network-side interface 902. The transmitter 906 may include any component or collection of components (e.g., up-converter, power amplifier, etc.) adapted to convert a baseband signal into a modulated carrier signal suitable for transmission over the network-side interface 902. The receiver 908 may include any component or collection of components (e.g., down-converter, low noise amplifier, etc.) adapted to convert a carrier signal received over the network-side interface 902 into a baseband signal. The signal processor 910 may include any component or collection of components adapted to convert a baseband signal into a data signal suitable for communication over the device-side interface(s) 912, or vice-versa. The device-side interface(s) 912 may include any component or collection of components adapted to communicate data-signals between the signal processor 910 and components within the host device (e.g., the processing system 800, local area network (LAN) ports, etc.).

The transceiver 900 may transmit and receive signaling over any type of communications medium. In some embodiments, the transceiver 900 transmits and receives signaling over a wireless medium. For example, the transceiver 900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 902 comprises one or more antenna/radiating elements. For example, the network-side interface 902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an adapting unit/module, a reverting unit/module, a determining unit/module, and/or an altering unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for operating a user equipment (UE), the method comprising:
    adjusting, by the UE, an initial beacon interval between successively wirelessly-transmitted beacons in accordance with a value of at least one parameter affecting beacon coverage and a beacon configuration wirelessly received from a network entity, the beacon configuration comprising allowable beacon intervals, thereby producing an adjusted beacon interval; and
    wirelessly transmitting, by the UE, a beacon selected in accordance with the adjusted beacon interval, in a beacon transmission opportunity determined in accordance with the initial beacon interval, the beacon conveying an identity of the UE and using radio resources assigned by the network entity.

2. The method of claim 1, wherein the at least one parameter comprises one or more of a current velocity of the UE, a historical velocity of the UE, a battery condition of the UE, a power usage condition of the UE, a signal quality indicator, or a mobility event.

3. The method of claim 1, wherein adjusting the initial beacon interval comprises decreasing the initial beacon interval if a velocity of the UE is high, or increasing the initial beacon interval if the velocity of the UE is low.

4. The method of claim 1, wherein adjusting the initial beacon interval comprises increasing the initial beacon interval if a battery condition of the UE is below a battery threshold, or decreasing the initial beacon interval if the UE is externally powered.

5. The method of claim 1, wherein adjusting the initial beacon interval comprises increasing the initial beacon interval in response to a signal quality indicator being below a quality threshold.

6. The method of claim 1, wherein adjusting the initial beacon interval comprises decreasing the initial beacon interval in response to a high number of mobility events being detected.

7. The method of claim 1, wherein adjusting the initial beacon interval comprises increasing the initial beacon interval if signaling to increase the initial beacon interval is received from the network entity, or decreasing the initial beacon interval if signaling to decrease the initial beacon interval is received from the network entity.

8. The method of claim 1, further comprising:
    receiving, by the UE, a confirmation of the adjusted beacon interval; and
        continuing, by the UE, to transmit subsequent beacons in beacon transmission opportunities determined in accordance with the adjusted beacon interval if the confirmation is received within a specified time interval after transmitting the beacon; or reverting, by the UE, back to the initial beacon interval if the confirmation is not received within the specified time interval after transmitting the beacon, and transmitting subsequent beacons in beacon transmission opportunities determined in accordance with the initial beacon interval.

9. The method of claim 1, further comprising:
receiving, by the UE, a rejection of the adjusted beacon interval; and
reverting, by the UE, back to the initial beacon interval; and
transmitting, by the UE, subsequent beacons in beacon transmission opportunities determined in accordance with the initial beacon interval.

10. A method for operating a network entity (NE), the method comprising:
wirelessly receiving, by the NE, a beacon interval indicator from a user equipment (UE); and
altering, by the NE, beacon reception opportunities for subsequent wirelessly-transmitted beacons in accordance with a beacon interval, the beacon interval determined in accordance with the beacon interval indicator, and each wirelessly-transmitted beacon conveying an identity of the UE and using radio resources assigned by the NE.

11. The method of claim 10, further comprising transmitting, by the NE, a confirmation of the beacon interval to the UE.

12. The method of claim 11, wherein the confirmation comprises one of a media access control (MAC) control element (CE) or physical (PHY) layer signaling.

13. The method of claim 10, further comprising transmitting, by the NE, a rejection of the beacon interval to the UE.

14. The method of claim 10, further comprising transmitting, by the NE, a beacon configuration comprising allowable beacon intervals to the UE.

15. A user equipment (UE) comprising:
a non-transitory memory storage comprising instructions; and
a processor in communication with the non-transitory memory storage, wherein the processor executes the instructions to:
adjust an initial beacon interval between successively wirelessly-transmitted beacons in accordance with a value of at least one parameter affecting beacon coverage and a beacon configuration wirelessly received from a network entity, the beacon configuration comprising allowable beacon intervals, thereby producing an adjusted beacon interval; and
wirelessly transmit a beacon selected in accordance with the adjusted beacon interval, in a beacon transmission opportunity determined in accordance with the initial beacon interval, the beacon conveying an identity of the UE and using radio resources assigned by the network entity.

16. The UE of claim 15, wherein the processor executes the instructions to:
receive a confirmation of the adjusted beacon interval; and
continue to transmit subsequent beacons in beacon transmission opportunities determined in accordance with the adjusted beacon interval if the confirmation is received within a specified time interval after transmitting the beacon; or
revert back to the initial beacon interval if the confirmation is not received within the specified time interval after transmitting the beacon, and transmitting subsequent beacons in beacon transmission opportunities determined in accordance with the initial beacon interval.

17. The UE of claim 15, wherein the processor executes the instructions to:
receive a rejection of the adjusted beacon interval;
revert back to the initial beacon interval; and
transmit subsequent beacons in beacon transmission opportunities determined in accordance with the initial beacon interval.

18. The UE of claim 15, wherein the at least one parameter affecting beacon coverage comprises one or more of a current velocity of the UE, a historical velocity of the UE, a battery condition of the UE, a power usage condition of the UE, a signal quality indicator, or a mobility event.

19. The UE of claim 15, wherein the processor executing the instructions to adjust the initial beacon interval comprises the processor executing the instructions to decrease the initial beacon interval if a velocity of the UE is high, or increase the initial beacon interval if the velocity of the UE is low.

20. The UE of claim 15, wherein the processor executing the instructions to adjust the initial beacon interval comprises the processor executing the instructions to increase the initial beacon interval if a battery condition of the UE is below a battery threshold, or decrease the initial beacon interval if the UE is externally powered.

21. The UE of claim 15, wherein the processor executing the instructions to adjust the initial beacon interval comprises the processor executing the instructions to increase the initial beacon interval in response to a signal quality indicator being below a quality threshold.

22. The UE of claim 15, wherein the processor executing the instructions to adjust the initial beacon interval comprises the processor executing the instructions to decrease the initial beacon interval in response to a high number of mobility events being detected.

23. The UE of claim 15, wherein the processor executing the instructions to adjust the initial beacon interval comprises the processor executing the instructions to increase the initial beacon interval in response to signaling to increase the initial beacon interval is received from the network entity, or decrease the initial beacon interval in response to signaling to decrease the initial beacon interval is received from the network entity.

24. A network entity (NE) comprising:
a non-transitory memory storage comprising instructions; and
a processor in communication with the non-transitory memory storage, wherein the processor executes the instructions to:
wirelessly receive a beacon interval indicator from a user equipment (UE); and
alter beacon reception opportunities for subsequent wirelessly-transmitted beacons in accordance with a beacon interval, the beacon interval determined in accordance with the beacon interval indicator, and each wirelessly-transmitted beacon conveying an identity of the UE and using radio resources assigned by the NE.

25. The NE of claim 24, wherein the processor executes the instructions to transmit a confirmation of the beacon interval to the UE.

26. The NE of claim 25, wherein the confirmation comprises one of a media access control (MAC) control element (CE) or physical (PHY) layer signaling.

27. The NE of claim 24, wherein the processor executes the instructions to transmit a rejection of the beacon interval to the UE.

28. The NE of claim 24, wherein the processor executes the instructions to transmit a beacon configuration comprising allowable beacon intervals to the UE.

* * * * *